(12) United States Patent
Raeymackers et al.

(10) Patent No.: US 12,234,394 B2
(45) Date of Patent: Feb. 25, 2025

(54) MARKING ELEMENT COMPRISING A REINFORCEMENT FABRIC

(71) Applicant: VETEX NV, Ingelmunster (BE)

(72) Inventors: Gert Raeymackers, Wetteren (BE); Jurgen Mispelon, Beerst (BE); Daniel Dewandel, Kortrijk (BE)

(73) Assignee: VETEX NV, Ingelmunster (BE)

( * ) Notice: Subject to any disclaimer, the term of this patent is extended or adjusted under 35 U.S.C. 154(b) by 534 days.

(21) Appl. No.: 17/254,312

(22) PCT Filed: Aug. 29, 2018

(86) PCT No.: PCT/IB2018/056584
§ 371 (c)(1),
(2) Date: Dec. 21, 2020

(87) PCT Pub. No.: WO2020/044078
PCT Pub. Date: Mar. 5, 2020

(65) Prior Publication Data
US 2021/0115306 A1 Apr. 22, 2021

(51) Int. Cl.
*C09J 7/29* (2018.01)
*B32B 3/04* (2006.01)
(Continued)

(52) U.S. Cl.
CPC .................. *C09J 7/29* (2018.01); *B32B 3/04* (2013.01); *B32B 5/022* (2013.01); *B32B 5/026* (2013.01);
(Continued)

(58) Field of Classification Search
CPC ....... Y10T 428/24942; Y10T 428/2495; Y10T 428/24959; Y10T 428/24967;
(Continued)

(56) References Cited

U.S. PATENT DOCUMENTS 5,874,133 A * 2/1999 Cochran .................. C08J 5/046
427/538
6,096,469 A * 8/2000 Anderson ................ B41M 5/52
427/256
(Continued)

FOREIGN PATENT DOCUMENTS

EP 3608102 A1 2/2020
JP 2000204326 7/2000
(Continued)

OTHER PUBLICATIONS

Machine translation (Espacenet) of JP 2009-013556 A. Translated Aug. 26, 2023. (Year: 2023).*

(Continued)

*Primary Examiner* — Maria V Ewald
*Assistant Examiner* — Ethan A. Utt
(74) *Attorney, Agent, or Firm* — Fresh IP PLC; Clifford D. Hyra; Aubrey Y. Chen

(57) ABSTRACT

A marking element (1) for the labelling of a textile, wherein said marking element (1) comprises an adhesive layer (2), a reinforcement fabric (3) and a printable layer (4) which forms an outer surface (5) of the marking element (1), wherein the said outer surface (5) is thermal transfer printable and/or digital printable and wherein the fabric (3) is embedded between the printable layer (4) and the adhesive layer (2), wherein the fabric (3) is a porous fabric (3) having a thickness of at most 1000 μm and in that one or both of the abovementioned layers (2, 4) extend at least partly through the fabric (3) in such a way that the said layers (2, 4) are in direct contact with each other and method for producing such a marking element (1).

17 Claims, 1 Drawing Sheet

(51) Int. Cl.
- *B32B 5/02* (2006.01)
- *B32B 5/26* (2006.01)
- *B32B 7/12* (2006.01)
- *B32B 27/08* (2006.01)
- *B32B 27/12* (2006.01)
- *B32B 27/22* (2006.01)
- *B32B 27/40* (2006.01)

(52) U.S. Cl.
CPC ............... *B32B 5/028* (2013.01); *B32B 5/26* (2013.01); *B32B 7/12* (2013.01); *B32B 27/08* (2013.01); *B32B 27/12* (2013.01); *B32B 27/22* (2013.01); *B32B 27/40* (2013.01); *B32B 2307/75* (2013.01); *B32B 2519/00* (2013.01); *C09J 2203/334* (2013.01); *C09J 2301/304* (2020.08); *C09J 2400/263* (2013.01); *C09J 2475/00* (2013.01)

(58) Field of Classification Search
CPC .......... Y10T 428/24975; Y10T 428/26; Y10T 428/263; Y10T 428/264; Y10T 428/265; Y10T 428/266; Y10T 428/269; Y10T 428/27; Y10T 428/273; Y10T 428/277; Y10T 428/28; Y10T 428/2813; Y10T 428/2817; Y10T 428/2826; Y10T 428/2848; Y10T 428/2852; Y10T 428/2896; Y10T 428/31551; Y10T 428/31562; Y10T 428/31565; Y10T 428/31591; Y10T 428/31786; Y10T 428/31725; Y10T 428/31971; Y10T 442/20; Y10T 442/2041; Y10T 442/2049; Y10T 442/2057; Y10T 442/2066; Y10T 442/2098; Y10T 442/2508; Y10T 442/2738; Y10T 442/2746; Y10T 442/2762; Y10T 442/277; Y10T 442/2861; Y10T 442/2893; Y10T 442/40; Y10T 442/419; Y10T 442/45; B32B 5/00; B32B 5/02; B32B 5/026; B32B 7/00; B32B 7/04; B32B 7/12; B32B 9/00; B32B 9/02; B32B 9/04; B32B 9/045; B32B 27/00; B32B 27/02; B32B 27/06; B32B 27/08; B32B 27/12; B32B 27/34; B32B 27/36; B32B 27/40; B32B 2255/00; B32B 2255/02; B32B 2255/26; B32B 2255/28; B32B 2260/00; B32B 2260/02; B32B 2260/021; B32B 2260/04; B32B 2260/046; B32B 2262/00; B32B 2262/02; B32B 2262/0261; B32B 2262/0276; B32B 2262/0284; B32B 2262/06; B32B 2262/062; B32B 2305/182; B32B 2405/00; C09J 7/00; C09J 7/20; C09J 7/21; C09J 7/30; C09J 7/35
USPC .... 428/32.39, 212, 213, 214, 315, 216, 219, 428/220, 343, 346, 347, 349, 354, 355 R, 428/355 N, 332, 334, 335, 336, 337, 339, 428/340, 341, 342, 423.1, 423.5, 423.7, 428/425.1, 474.4, 475.5, 480, 532; 442/59, 64, 65, 66, 67, 71, 121, 149, 150, 442/152, 153, 164, 168, 304, 307, 312
See application file for complete search history.

(56) References Cited

U.S. PATENT DOCUMENTS

| | | |
|---|---|---|
| 8,765,257 B2 | 7/2014 | Weedlun |
| 10,252,502 B2 | 4/2019 | Weedlun |
| 2009/0208759 A1* | 8/2009 | Kanagawa ......... C08G 18/4829 428/423.1 |

FOREIGN PATENT DOCUMENTS

| | | |
|---|---|---|
| JP | 2009013556 A * | 1/2009 |
| WO | WO/2013/181325 | 12/2013 |
| WO | WO/2018/220519 | 12/2018 |

OTHER PUBLICATIONS

Search Report for International Patent Application PCT/IB2018/056584, malled on Mar. 5, 2020.

Amano Y et al., Heat bonding sheet for thermal transfer printing contains textile provided between adhesive layer, and resin having predetermined softening point and an ink receptor layer having ink acceptance surface11, WPI/Thomson, vol. 2000, No. 53, Jul. 25, 2000.

EP Office Action for Application No. 18 773 264.9, mailing date of May 16, 2023.

* cited by examiner

MARKING ELEMENT COMPRISING A REINFORCEMENT FABRIC

BACKGROUND

This invention concerns a marking element for the labelling of a textile, wherein said marking element comprises an adhesive layer for securing the marking element to a textile, a reinforcement fabric and a printable layer which forms an outer surface of the marking element, wherein the said outer surface is thermal transfer (TTR) printable and/or digital printable and wherein the fabric is embedded between the printable layer and the adhesive layer.

This invention also concerns a method for manufacturing a marking element for the labelling of a textile, wherein this marking element comprises a first layer, a reinforcement fabric and a second layer, wherein the fabric is embedded between the first layer and the second layer.

Marking elements are used to mark textiles, such as clothes, sheets, towels, etc. They are specifically used for the labelling of working clothes, uniforms, sheets and/or towels in hotels, hospitals, retirement homes, factories, etc. These marking elements are normally meant to stay attached to a said textile even after several industrial and/or domestic washing cycles. Industrial washing cycles, are washing cycles with a maximum temperature of approximately 95° C. Domestic washing cycles for clothes often do not reach temperatures higher than 60° C. With several washing cycles, more than 50 washing cycles are meant.

If the textiles are used in heavy duty industries, such as construction, chemical industry, metal industry, etc. it is important that the marking element has a certain mechanical strength. Also, if industrial washing is performed, it is of importance that the marking elements have sufficient mechanical strength. For this, reinforcement fabrics are used. The reinforcement fabric needs to be connected to the layers of the marking element in a good manner, such that the different parts of the marking element do not come apart during the use of the marking element. The fabric is therefore first coated on both sides with a primer, then a non-adhesive coating layer is applied on top of both primers. Only then can the functional layers be applied, such as an adhesive layer for securing the marking element to a textile and a printable layer on which a barcode/name/logo/etc. can be printed. This is a complex process, because many different layers have to be applied. Because of all these different layers, the marking element also has a certain thickness, such that the marking element is relatively stiff, is prone to shrinking and is prone to curling up. Because of the stiffness, persons wearing textiles with such marking elements, often experience discomfort. It also takes a relatively long time to apply these marking elements with the aid of heat and pressure to a textile. For example, to apply a marking element to a textile, one can place the adhesive layer upon the textile and apply heat and pressure to the surface opposite the adhesive layer. This means that the heat needs to penetrate all the other layers before it reaches the adhesive layer. Since the marking element is relatively thick, it takes some time for the heat to reach the adhesive layer, such that applying the marking element to a textile takes up a relatively long time.

SUMMARY

It is therefore an object of the invention to provide a marking element with sufficient mechanical strength, which is more comfortable to wear and can be applied faster. It is also an object of the invention to provide a marking element with sufficient mechanical strength, which can be more easily manufactured.

This object is achieved by providing a marking element for the labelling of a textile, wherein said marking element comprises an adhesive layer for securing the marking element to a textile, a reinforcement fabric and a printable layer which forms an outer surface of the marking element, wherein the said outer surface is thermal transfer printable and/or digital printable and wherein the fabric is embedded between the printable layer and the adhesive layer, wherein the fabric is a porous fabric having a thickness of at most 1000 μm and in that one or both of the abovementioned layers extend at least partly through the fabric in such a way that the said layers are in direct contact with each other and adhere to each other.

One or both of the abovementioned layers extend at least partly through the fabric. This means that that one or both the layers at least partly penetrate the fabric. With the term fabric can be meant, woven fabrics, non-woven fabrics, knitted fabrics, netting fabrics, technical fabrics, etc. The reinforcement fabric has a certain porosity and is sufficiently thin, such that one or both of the said layers at least partly extend through the fabric, and thus at least partly have penetrated the fabric, such that the adhesive layer and the printable layer are in direct contact with each other. The adhesive layer and the printable layer thus directly adhere to each other, causing this marking element to be a marking element where the different parts/layers do not easily come apart during the use of the marking element. The reinforcement fabric ensures a good mechanical strength. This marking element has therefore sufficient mechanical strength, such that it can be used to mark textiles used in heavy duty industries and/or can undergo industrial washing. This marking element can however be made thinner than the existing marking elements comprising a reinforcement fabric, because the reinforcement fabric does not need to be treated with primers since the abovementioned layers are adhered to each other despite the presence of the reinforcement fabric. This marking element can thus be more flexible and can be more comfortable to wear. Preferably the fabric has a thickness of at most 500 μm, more preferably of at most 200 μm. To achieve such a relatively low thickness, the reinforcement fabric could have undergone a calendaring action before or during the manufacturing of the marking element.

Because of the porosity and the limited thickness of the reinforcement fabric, heat can easily be transferred through the fabric. To apply such a marking element to a textile, one can use heat and pressure if the adhesive layer is attachable to a textile under the influence of heat and pressure. One than places the marking element upon the textile in such a way that the adhesive layer contacts the textile. One can choose then to apply heat and pressure to the top of the marking element and to the bottom of the textile. However one can only apply heat and pressure to the top of the marking element thus to the printable layer. Here it is very important that the heat can easily transfer to the adhesive layer, such the adhesive layer can attach to the textile. Here, the reinforcement fabric will virtually not hinder the heat transfer from the printable layer to the adhesive layer, since this fabric is very thin and porous.

Preferably at least one of the abovementioned layers extends completely through the fabric. This ensures a very good bond between the adhesive layer and the printable layer. This marking element can therefore withstand many industrial washing cycles.

In specific embodiments the fabric layer is a scrim, a net, a (warped) knit or a non-woven. The fabrics can be made out of polyester, nylon, cotton, etc. The fabric can for example be a taffeta, such as a polyester taffeta knit of approximately 50 g/m². Such a taffeta knit is a very soft and very flexible fabric which has sufficient mechanical strength. Also this fabric will not melt during the attachment of the marking element to a textile with the aid of heat and pressure. Such a fabric is an open fabric with sufficient porosity such that one or both of the said layers can easily penetrate the fabric during the manufacturing of the marking element. The reinforcement fabric preferably has a decomposition temperature of above 205° C., more preferably of above 210° C., even more preferably of above 220° C.

In a preferred embodiment the printable layer comprises a first printable sublayer which comprises the said outer surface, wherein this printable sublayer comprises a polyurethane, preferably a thermoset polyurethane. A thermoset is a polymer which cannot be melted and reformed and is therefore a durable polymer. A sublayer comprising a said thermoset thus forms a durable sublayer which will not deteriorate by washing. During the attachment of the marking element to a textile by applying heat and pressure, the first pintable sublayer will also not alter, melt or degrade. The thermoset polyurethane preferably has a decomposition temperature of above 205° C., more preferably of above 210° C., even more preferably of above 220° C.

In an alternative embodiment the printable layer comprises a first printable sublayer which comprises the said outer surface, wherein this printable sublayer comprises a thermoset, which is not a thermoset polyurethane.

Preferably the printable layer comprises a first printable sublayer and a contact sublayer, wherein said printable sublayer comprises the said outer surface and said contact sublayer is in direct contact with the adhesive layer and wherein the reinforcement fabric is embedded between the contact sublayer and the adhesive layer. Further preferably the printable sublayer comprises a polyurethane, more preferably a thermoset polyurethane. With the aid of a contact sublayer, it can be easily assured that the adhesive layer is in direct contact with the printable layer and that there is a good adherence of the printable layer with the adhesive layer. Here one only has to provide a printable sublayer which is very suitable to be printed upon. Therefore it is not necessary that the printable sublayer can easily extend through the fabric, because this printable sublayer is normally not in direct contact with fabric. This printable sublayer does not have to be able to form a strong connection with the adhesive layer, because the contact sublayer performs that function. Here one can provide a contact sublayer which can easily extend through the reinforcement fabric and which can adhere in a strong manner with the adhesive layer. The contact sublayer can be a thermoset, for example a thermoset polyurethane, such that the said contact sublayer will not deteriorate by washing and will not, during the attachment of the marking element to a textile by applying heat and pressure, alter, melt or degrade.

In a preferred embodiment the adhesive layer comprises an adhesive sublayer which forms a second outer surface of the marking element, wherein this adhesive sublayer is attachable to a textile under the influence of heat and pressure and wherein this adhesive sublayer comprises a polyurethane, preferably a thermoplastic polyurethane. Such urethanes are well suited to attach to a textile. Under the influence of heat, at least part of the thermoplastic polyurethane of the adhesive sublayer will liquefy. With the aid of pressure, said liquefied thermoplastic urethane is then partly pressed into the textile. The thermoplastic urethane hardens again during the cooling down, with the result that the marking element is attached to the textile. For said attachment a patch machine can be used. Such a patch machine will for example apply a pressure situated between 3 and 5 bar and apply a temperature situated between 190° C. and 205° C. and this for at least 10 seconds. The number of seconds needed, can here be reduced because of the good heat transfer through the reinforcement fabric, causing the adhesive sublayer to liquefy more rapid. For certain marking elements sufficient heat and pressure can also be applied by ironing. This adhesive sublayer preferably has a thickness of between 80 to 150 μm.

Preferably the adhesive layer comprises an adhesive sublayer and a contact sublayer, wherein this adhesive sublayer forms a second outer surface of the marking element and is attachable to a textile under the influence of heat and pressure, wherein said contact sublayer is in direct contact with the printable layer and wherein the reinforcement fabric is embedded between the contact sublayer of the adhesive layer and the printable layer. Further preferably the said adhesive sublayer comprises a polyurethane, preferably a thermoplastic polyurethane. With the aid of a contact sublayer, it can be easily assured that the adhesive layer is in direct contact with the printable layer. Here one only has to provide an adhesive sublayer which is very suitable to attach to a textile. One does not have to consider the possibility of the adhesive sublayer to extend through the fabric. The contact sublayer can be a thermoset, for example a thermoset polyurethane, such that the said contact sublayer will not deteriorate by washing and will not, during the attachment of the marking element to a textile by applying heat and pressure, alter, melt or degrade. The contact between the adhesive layer and the printable layer will then not alter or deteriorate during the attachment of the marking element to a textile. The adhesive sublayer does not have to be able to form a strong connection with the printable layer, because the contact sublayer performs that function. Here one can provide in a contact sublayer which can easily extend through the reinforcement fabric and which can adhere in a strong manner with the printable layer.

This invention also concerns a method for manufacturing a marking element for the labelling of a textile, wherein this marking element comprises a first layer, a reinforcement fabric and a second layer, wherein the fabric is embedded between the first layer and the second layer, wherein the first layer is formed, the fabric is applied upon the first layer and the second layer is coated upon the fabric, wherein the fabric is a porous fabric having a thickness of at most 1000 μm and the second layer is coated upon said fabric in such a way that the second layer at least partly penetrates the fabric and directly contacts the first layer and adheres to the first layer, and wherein the first layer is a printable layer which forms an outer surface of the marking element which is thermal transfer printable and/or digital printable, and the second layer is an adhesive layer for securing the marking element to a textile or vice versa.

By first applying the fabric to the first layer and then coating the second layer onto the fabric in such a way that the second layer at least partly penetrates the fabric, one can ensure that the first layer and the second layer will directly contact each other. A strong and direct connection between the first layer and the second layer is here formed. Preferably the first layer will, during the appliance of the fabric, partly or completely penetrate the fabric. In an alternative embodiment the first layer will not penetrate the fabric during the appliance of the fabric. In this last embodiment it is of importance that the second layer than completely penetrates the fabric such that there is direct contact between the first layer and the second layer. To ensure that the second layer will at least partly penetrate the fabric, and preferably fully penetrate the fabric, different manufacturing options or combinations of different manufacturing options are possible. One can for example coat the second layer onto the fabric when the second layer still has a low viscosity. If solvent coating is used, one can use more solvent. If water is used for coating, one can use more water. One can also use plasticizers. One can also coat at a higher temperature, etc.

The first layer can be for example the printable layer and this printable layer can only comprise a first sublayer. This first sublayer is then a printable sublayer which comprises the outer surface. When the first layer is coated upon a release surface, the printable sublayer is in direct contact with the release substrate during the manufacturing of the marking element. This release surface is later on removed such that a barcode/a name/a logo/etc. can be printed upon the outer surface. This printable sublayer is preferably a polyurethane and more preferably a thermoset polyurethane.

However the first layer can also be the printable layer wherein this printable layer comprises a first sublayer and a second sublayer. This first sublayer is then a printable sublayer which comprises the outer surface. When the first layer is coated upon a release surface, the first sublayer is in direct contact with the release substrate during the manufacturing of the marking element. This release surface is later on removed such that a barcode/a name/a logo/etc. can be printed upon the outer surface. This printable sublayer is preferably a polyurethane and more preferably a thermoset polyurethane. The second sublayer is then preferably a contact sublayer which comprises a polyurethane and more preferably a thermoset polyurethane. Here one preferably takes a contact sublayer which can easily penetrate the fabric when the fabric is applied upon the contact sublayer. Preferably the printable sublayer is first coated upon a release substrate, then the contact sublayer is coated upon the printable sublayer and then the fabric is applied upon the contact sublayer.

The second layer can be for example the adhesive layer and this adhesive layer can only comprise one sublayer. This sublayer is then an adhesive sublayer such that the formed marking element can be applied to a textile with the aid of heat and pressure. This adhesive sublayer is preferably a polyurethane and more preferably a thermoplastic polyurethane.

However the second layer can also be the adhesive layer wherein this adhesive layer comprises two sublayers, namely an adhesive sublayer and a contact sublayer. With the aid of the adhesive sublayer, the formed marking element can be applied to a textile with the aid of heat and pressure. This adhesive sublayer is preferably a polyurethane and more preferably a thermoplastic polyurethane. The adhesive layer also comprises the contact sublayer which is coated upon the fabric in such a way that the contact sublayer at least partly penetrates the fabric. The contact sublayer is here coated upon the fabric and preferably the adhesive sublayer is coated upon the contact sublayer after the contact sublayer is coated upon the fabric. The contact sublayer can be a thermoset polyurethane To make sure that the second layer at least partly penetrates the fabric and preferably fully penetrates the fabric one can use different techniques. One can for example make use of solvents and/or water and/or plasticizers and/or sufficient heat. Preferably the second layer fully penetrates the fabric during the coating of the second layer upon the fabric.

The fabric is preferably laminated upon the first layer. This lamination can for example be a wet lamination, a dry lamination or a semi wet lamination. For dry lamination one can for example use a heated roll.

Further in a specific embodiment the first layer is coated upon a release substrate, and in that the first layer comprises at least a first sublayer which is coated in at least a partly wet condition, after which the first sublayer is further dried, wherein the fabric is laminated upon the first sublayer when the first sublayer is still in an at least partly wet condition. If the first sublayer is for example coated without the aid of solvents or water, the first sublayer is preferably coated in an unpolymerized or a partly polymerised condition. One can then directly apply the fabric or one can further polymerize the first sublayer up to a condition were the first sublayer is not fully polymerised and then apply the fabric. If the first sublayer is for example coated with the aid of solvents or water, one can after the coating of the first sublayer, directly apply the fabric or first evaporate a part of the solvents or the water and then apply the fabric. Even more preferably the first layer or the sublayer of the first layer upon which the fabric is applied, comprises polyurethane, wherein a mixture comprising polyurethane components is coated to apply the said first layer or the said sublayer, wherein the mixture is polymerised during the drying of the first layer or the said sublayer.

Further in another embodiment, the first layer is coated upon a release substrate, and the first layer comprises at least a first sublayer which is coated in at least a partly wet condition, after which the first sublayer is further dried, wherein the fabric is laminated upon the first sublayer after the drying of the first sublayer. During the drying, the first sublayer is polymerised, when the first sublayer is coated in an unpolymerized or a partly polymerised condition. During the drying the solvents or the water are evaporated, when the first sublayer is coated with the aid of solvents or water. The lamination can be performed with the aid of a heated roll.

Preferably a marking element as described above is manufactured.

DETAILED DESCRIPTION OF THE DRAWINGS

Figure 1:
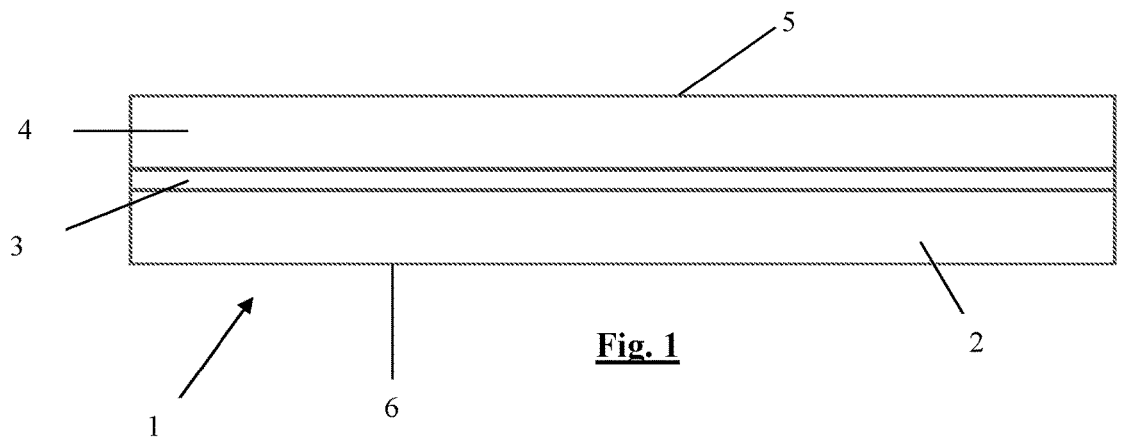
FIG. 1 shows a schematic cross-section of a first embodiment of a marking element according to invention.

The invention will now be described in greater depth based on the following detailed description of three embodiments of marking elements according to the invention and methods to produce such marking elements. The purpose of this description is to give illustrative examples and to indicate further advantages and special features of preferred embodiments according to this invention and should not be interpreted as a limitation of the scope of the application of the invention or of the patent rights requested in the claims. This detailed description employs reference numerals to refer to the appended drawings.

All the marking elements (1) described in the figures comprise an adhesive layer (2), a printable layer (4) and a reinforcement fabric (3). The reinforcement fabric (3) is indicated as an additional layer of the marking element (1) between the adhesive layer (2) and the printable layer (4). In reality the reinforcement fabric (3) is embedded between the adhesive layer (2) and the printable layer (4), in such a way that the adhesive layer (2) and the printable layer (4) are in direct contact with each other. The adhesive layer (2) and/or the printable layer (4) at least partly penetrate the reinforcement fabric (3). The partition between the adhesive layer (2), the reinforcement fabric (3) and the printable layer (4) is thus not as strict as indicated in the figures.

The printable layer (4) forms a first outer surface (5) of the marking element (1) which is thermal transfer printable and/or digital printable. The adhesive layer (2) forms a second outer surface (6) of the marking element (1), wherein this second outer surface (6) is located opposite the first outer surface (5). The reinforcement fabric (3) is a porous fabric (3) with a thickness of at most 1000 µm. The fabric (3) can be a net, a scrim, a knitting or a non-woven.

The marking element (1) shown in FIG. 1 has the following features: the printable layer (4) only has one sublayer (4) namely a printable sublayer (4). The printable sublayer (4) thus comprises the first outer surface (5) and forms the printable layer (4). This printable sublayer (4) comprises a thermoset polyurethane. The adhesive layer (2) has only one sublayer (2), namely an adhesive sublayer (2). The adhesive sublayer (2) thus comprises the second outer surface (6) and forms the adhesive layer (2). This adhesive sublayer (2) comprises a thermoplastic polyurethane and is attachable to a textile under the influence of heat and pressure, such that the marking element (1) is attachable to a textile under the influence of heat and pressure. Here the printable sublayer (4) and the adhesive sublayer (2) are in direct contact with each other and are bonded to each other.

Figure 2:
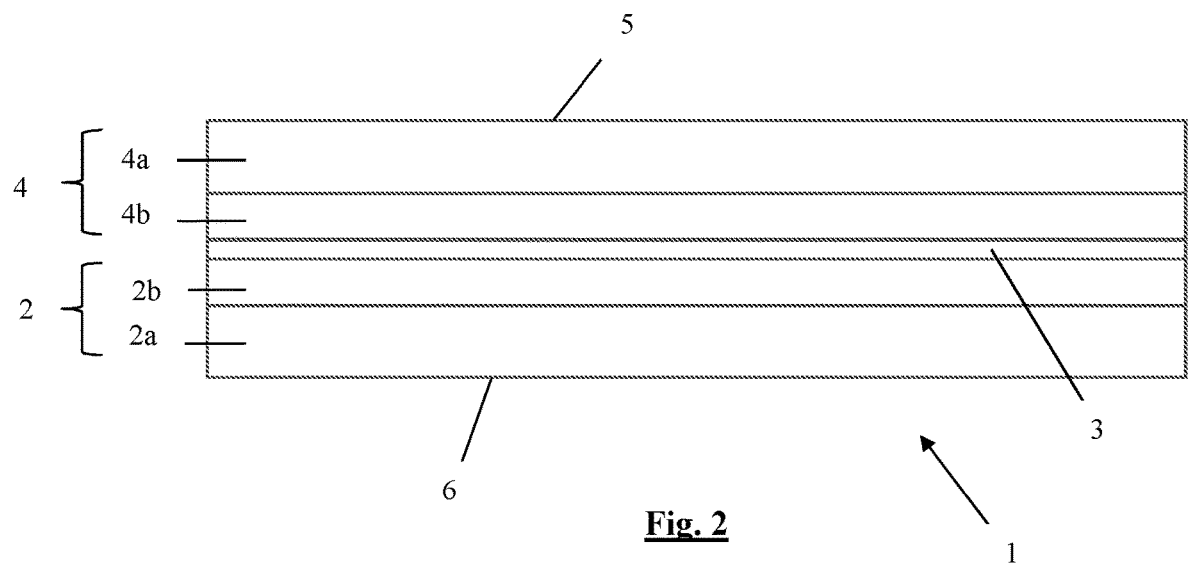
FIG. 2 shows a schematic cross-section of a second embodiment of a marking element according to invention.

FIG. 2 shows a marking element (1) with the following features: the printable layer (4) has two sublayers (4a, 4b) namely a printable sublayer (4a) and a contact sublayer (4b). The printable sublayer (4a) comprises the first outer surface (5). This printable sublayer (4a) comprises a thermoset polyurethane. The adhesive layer (2) has two sublayers (2a, 2b), namely an adhesive sublayer (2a) and the contact sublayer (2b). The adhesive sublayer (2a) comprises the second outer surface (6). This adhesive sublayer (2a) comprises a thermoplastic polyurethane and is attachable to a textile under the influence of heat and pressure, such that the marking element (1) is attachable to a textile under the influence of heat and pressure. Here the contact sublayers (2b, 4b) each fully penetrate the reinforcement fabric (3). The contact sublayers (2b, 4b) are in direct contact with each other and are bonded to each other. The contact sublayers (2b, 4b) each comprises a thermoset polyurethane.

Figure 3:
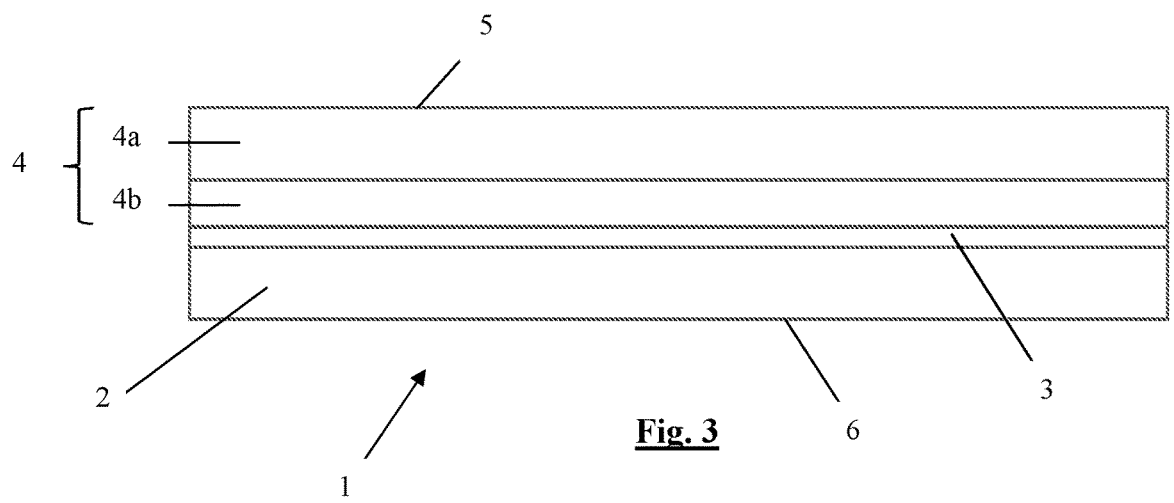
FIG. 3 shows a schematic cross-section of a third embodiment of a marking element according to invention.

The marking element (1) shown in FIG. 3 has the following features: the printable layer (4) has two sublayers (4a, 4b) namely a printable sublayer (4a) and a contact sublayer (4b). The printable sublayer (4a) comprises the first outer surface (5). This printable sublayer (4a) comprises a thermoset polyurethane. The adhesive layer (2) only has one sublayer (2), namely an adhesive sublayer (2). The adhesive sublayer (2) comprises the second outer surface (6) and forms the adhesive layer (2). This adhesive sublayer (2) comprises a thermoplastic polyurethane and is attachable to a textile under the influence of heat and pressure, such that the marking element (1) is attachable to a textile under the influence of heat and pressure. Here the contact sublayer (4b) fully penetrates the reinforcement fabric (3). The contact sublayer (4b) is in direct contact with the adhesive layer (2) and comprises a thermoset polyurethane.

The abovementioned marking elements (1) could be made as following. First the printable layer (4) is coated upon a release surface. This release surface can for example be a release paper. When the printable layer (4) has the abovementioned to sublayers (4a, 4b), then the printable sublayer (4a) is first coated upon the release surface and then the contact sublayer (4b) is coated upon the printable sublayer (4a). Then the reinforcement fabric (3) is applied upon the printable layer (4). The one or both sublayers (4a, 4b) of the printable layer (4) are coated without the aid of solvents or water and are coated in an unpolymerized condition. The fabric (3) is laminated upon the printable layer (4) when the printable layer (4) is not fully polymerized. This lamination is therefore a wet lamination such that the printable layer (4) easily at least partly penetrates the fabric (3) during the lamination. Then the adhesive layer (2) is coated upon the fabric (3) in such a way that the adhesive layer (2) fully penetrates the fabric (3), comes into direct contact with the printable layer (4) and adheres to the printable layer (4). When the adhesive layer (2) comprises the said two sublayers (2a, 2b), first the contact sublayer (2b) is coated upon the fabric (3) and then the adhesive sublayer (2a) is coated upon the contact sublayer (2b).

The invention claimed is:

1. A marking element for the labelling of a textile, wherein said marking element comprises an adhesive layer for securing the marking element to a textile, a reinforcement fabric and a printable layer which forms an outer surface of the marking element, wherein the said outer surface is thermal transfer printable and wherein the fabric is embedded between the printable layer and the adhesive layer, wherein the fabric is a porous fabric having a thickness of at most 1000 µm and in that one or both of the printable layer and the adhesive layer extend at least partly through the fabric in such a way that the said layers are in direct contact with each other and adhere to each other, wherein the fabric is a knit,
wherein the printable layer comprises a thermoset polyurethane,
wherein the adhesive layer comprises a first portion, wherein the printable layer comprises a second portion, wherein the first portion and the second portion directly contact each other, wherein both the first portion and the second portion do not deteriorate due to washing, and wherein, when heat and pressure are applied to the marking element to label the textile, both the first portion and the second portion are neither altered nor melted due to the heat and pressure.

2. A marking element according to claim 1, wherein at least one of the printable layer and the adhesive layer extends completely through the fabric.

3. A marking element according to claim 1, wherein the printable layer comprises a first printable sublayer which comprises the said outer surface, wherein this printable sublayer comprises a polyurethane.

4. A marking element according to claim 3, wherein the polyurethane is a thermoset polyurethane.

5. A marking element according to claim 1, wherein the printable layer comprises a first printable sublayer and a contact sublayer, wherein said printable sublayer comprises the said outer surface and said contact sublayer is in direct contact with the adhesive layer and wherein the reinforcement fabric is embedded between the contact sublayer and the adhesive layer.

6. A marking element according to claim 1, wherein the adhesive layer comprises an adhesive sublayer which forms a second outer surface of the marking element, wherein this adhesive sublayer is attachable to a textile under the influence of heat and pressure and wherein this adhesive sublayer comprises a polyurethane.

7. A marking element according to claim 6, wherein the polyurethane is a thermoplastic polyurethane.

8. A marking element according to claim 1, wherein the adhesive layer comprises an adhesive sublayer and a contact sublayer, wherein this adhesive sublayer forms a second outer surface of the marking element and is attachable to a textile under the influence of heat and pressure, wherein said contact sublayer is in direct contact with the printable layer and wherein the reinforcement fabric is embedded between the contact sublayer of the adhesive layer and the printable layer.

9. Method for manufacturing a marking element for the labelling of a textile, wherein this marking element comprises a first layer, a reinforcement fabric and a second layer, wherein the fabric is embedded between the first layer and the second layer, wherein the first layer is formed, the fabric is applied upon the first layer and the second layer is coated upon the fabric, wherein the fabric is a porous fabric having a thickness of at most 1000 µm and the second layer is coated upon said fabric in such a way that the second layer at least partly penetrates the fabric and directly contacts the first layer and adheres to the first layer, and in that the first layer is a printable layer which forms an outer surface of the marking element which is thermal transfer printable, and the second layer is an adhesive layer for securing the marking element to a textile or vice versa, wherein the fabric is a knit, wherein the printable layer comprises a thermoset polyurethane, wherein the adhesive layer comprises a first portion, wherein the printable layer comprises a second portion, wherein the first portion and the second portion directly contact each other, wherein both the first portion and the second portion do not deteriorate due to washing, and wherein when heat and pressure are applied to the marking element to label the textile, both the first portion and the second portion are neither altered nor melted due to the heat and pressure.

10. Method according claim 9, wherein the knit is a warped knit.

11. Method according to claim 9, wherein the second layer fully penetrates the fabric during the coating of the second layer upon the fabric.

12. Method according to claim 9, wherein the fabric is laminated upon the first layer.

13. Method according to claim 12, wherein the first layer is coated upon a release substrate, and in that the first layer comprises at least a first sublayer which is coated in at least a partly wet condition, after which the first sublayer is further dried, wherein the fabric is laminated upon the first sublayer when the first sublayer is still in an at least partly wet condition.

14. Method according to claim 13, wherein the first sublayer comprises a polyurethane and to coat the first sublayer, a mixture comprising polyurethane components is coated, wherein the mixture is polymerised during the drying of the first sublayer.

15. Method according to claim 12, wherein the first layer is coated upon a release substrate, and in that the first layer comprises at least a first sublayer which is coated in at least a partly wet condition, after which the first sublayer is further dried, wherein the fabric is laminated upon the first sublayer after the drying of the first sublayer.

16. A marking element for the labelling of a textile, comprising:

an adhesive layer for securing the marking element to the textile, the adhesive layer forming a bottom of the marking element;

a printable layer that forms a top of the marking element, the top of the marking element being opposite to the bottom of the marking element; and a layer of reinforcing fabric at an intersection of a top portion of the adhesive layer and a bottom portion of the printable layer, the layer of reinforcing fabric being porous and having a thickness of less than 1,000 µm, wherein the top portion of the adhesive layer and the bottom portion of the printable layer directly contact, and adhere to, each other through the layer of reinforcing fabric, wherein both the top portion of the adhesive layer and the bottom portion of the printable layer are thermoset polyurethanes, wherein a bottom portion of the adhesive layer is configured for directly contacting the textile, the bottom portion being a thermoplastic polyurethane, and wherein the reinforcing fabric is a knit.

17. A marking element according to claim 16, wherein both the top portion of the adhesive layer and the bottom portion of the printable layer do not deteriorate due to washing, wherein, when heat and pressure are applied to the marking element to label the textile, both the top portion of the adhesive layer and the bottom portion of the printable layer are neither altered nor melted due to the heat and pressure, wherein the reinforcement fabric has a decomposition temperature greater than 205° Celsius, and wherein the thermoset polyurethanes have a decomposition temperature greater than 205° Celsius.

* * * * *